United States Patent [19]
Shinjo

[11] Patent Number: 5,913,421
[45] Date of Patent: Jun. 22, 1999

[54] SCREW-HOLDING BELT

[75] Inventor: Katsumi Shinjo, Osaka, Japan

[73] Assignee: Yugenkaisha Shinjo Seisakusho, Osaka, Japan

[21] Appl. No.: 09/187,403

[22] Filed: Nov. 6, 1998

[30]     Foreign Application Priority Data

Nov. 10, 1997   [JP]   Japan .................................... 9-325301

[51] Int. Cl.[6] ................................................. B65D 85/24
[52] U.S. Cl. ........................ 206/341; 206/347; 206/486
[58] Field of Search .................................. 206/338, 341, 206/486, 343, 345, 346, 347, 477, 478

[56]                References Cited

U.S. PATENT DOCUMENTS

| 5,713,709 | 2/1998 | Huang | 206/345 X |
| 5,775,514 | 7/1998 | Lin | 206/343 X |

FOREIGN PATENT DOCUMENTS 8189520   7/1996   Japan .

Primary Examiner—Jacob K. Ackun
Attorney, Agent, or Firm—Antonelli, Terry, Stout & Kraus, LLP

[57]                ABSTRACT

A screw-holding belt (10) is composed of a belt body (11) made of a flexible plastics sheet, and cutouts (12) serving to intermittently drive the belt body are formed in and along either or both the lateral sides of the belt body. Screw-holding cylinders (13) are formed in the belt body at the same pitch as the cutouts so as to receive and hold shanks (17) of headed screws (16). The belt further has apertures (14) formed in it and extending outwardly and radially from the opening of each cylinder (13), and each aperture (14) is of a sector form having a width increasing towards its bottom (14a) such that these bottoms are portions of an imaginary circle coaxial with the cylinder and having a diameter greater than that of a head (18) of each screw (16). The adjacent two apertures (14) define between them a skirt (15) whose circumferential width decreases towards the imaginary circle.

3 Claims, 2 Drawing Sheets

SCREW-HOLDING BELT

BACKGROUND OF THE INVENTION

1. Field of the Invention

The present invention relates to a belt that holds thereon a row of self-drilling screws or the like headed screws so as to successively carry them into a power-driven screw driver, wherein this driver continuously and efficiently operates to drive and fasten those screws one by one to a pair of articles overlying one another. Particularly, the invention relates to such a belt especially adapted to hold and carry those screws each having a seal ring juxtaposed to the head and protruding radially and outwardly of the head to thereby increase the effective diameter thereof.

2. Prior Art

Some screw-holding belts of this type are disclosed in the U.S. Pat. No. 4,059,034 and some other prior art references. For example, the Japanese Patent Laying-Open Gazette No. 8-189520 teaches a screw-holding belt having a row of screw receptors from which screws can readily slip off. As shown in FIG. 5, this belt comprises a belt body 1 that is made of a flexible synthetic resin such as a polyethylene. Cutouts 2 formed in and along each of lateral sides of that body 1 are arranged at regular intervals for driving the belt to intermittently advance. A row of screw-holding cylinders 3 as the principal parts of the receptors are formed longitudinally of the belt body and at the same pitch as the cutouts so that shanks 7 of headed screws 6 may be inserted in and held by those cylinders. Four apertures 4 each of a sector form are also formed in the body such that they extend radially and outwardly from each periphery of the screw-holding cylinder 3. The sector has a pointed top merging with the periphery and a bottom located remote therefrom. Each cylinder 3, the four apertures 4 and four skirts 5 each interposed between the adjacent two apertures thus constitute each screw receptor.

In use, the belt of the described structure and loaded with the headed screws 6 will be set at first on a screw striker installed in a power driver not shown in detail. While the belt is advancing intermittently by the pitch mentioned above, a driver bit 9 will push the headed screws 6 one by one out of the belt body 1 so as to force them into articles that are to be fastened together. When each of the headed screws 6 thus springs from the belt, its head 8 will cause the skirts 5 to bend themselves towards the cylinder 3 until the cylinder 3 is broken at its portions merging with the pointed tops of apertures 4. It is noted here that the bending resistance of the skirts 5 will generally be proportional to a distance 'A' (see FIG. 5) between the adjacent aperture bottoms.

In most cases, flexible materials for forming the belt bodies 1 have been soft polyethylenes. Polyethylenes have been found to further soften when used in summer at hot construction sites to such an extent that those belts could scarcely be driven by a correct predetermined pitch. Thus in some cases, harder polypropylenes have recently been substituting for polyethylenes as the materials of the screw-holding belts.

However, such hard polypropylene belt bodies 1 have often been observed to render the skirts 5 in the prior art structures more resistant to bend. Operators must apply a stronger power to the screw heads 8 at the step of removing same from the belt bodies, thereby causing a hard work to them. In addition, such a strong force have often caused deformation of those belt bodies 1, with the latter consequently failing to smoothly advance by a correct pitch. If those screw heads 8 had seal rings protruding outwards and radially therefrom, then those heads could not easily be thrust out even where the belt bodies 1 were made of a softer material.

SUMMARY OF THE INVENTION

The present invention was made in view of and for resolving the problems in the prior art. An object of the present invention is therefore to provide a screw-holding belt that comprises a belt body and a series of screw holders formed therein and each having skirts such that the bending resistance thereof is so moderate that headed screws can readily be taken out of the holders, even in a case wherein the belt body is made of a considerably hard resin such as a polypropylene. A more particular object is to provide a screw-holding belt that is adapted for large-headed screws each having a seal ring adjacent to the head.

In order to achieve these objects, a belt provided herein to receive and hold a row of headed screws does comprise a belt body that is a band made of a flexible plastics sheet, a row of cutouts formed at a pitch in and along at least one of opposite lateral sides of the belt body, the cutouts serving to intermittently drive the belt body, and a row of screw-holding cylinders formed in the belt body longitudinally thereof and at the same pitch as the cutouts, wherein each cylinder has an opening located in flush with an upper surface of the belt body so as to receive and hold a shank of each headed screw. The belt further comprises a plurality of apertures formed in the belt body and extending outwardly and radially from a periphery of the opening of each screw-holding cylinder, with each aperture being of a sector form having a width increasing towards its bottom located most remote from said cylinder such that these bottoms are portions of an imaginary circle which is coaxial with the cylinder and of a diameter relatively greater than that of a head of each screw, wherein the adjacent two apertures define between them a skirt. A characterizing feature of the present invention resides in that each skirt defined between the adjacent two apertures has a circumferential width decreasing towards the imaginary circle, and more preferably the width of each skirt between the bottoms of the adjacent two apertures is smaller than a circumferential length of the bottom of each aperture.

BRIEF DESCRIPTION OF THE DRAWINGS

In the drawings illustrating the present invention as summarized above.

DETAILED DESCRIPTION OF THE PREFERRED EMBODIMENTS

Figure 1:
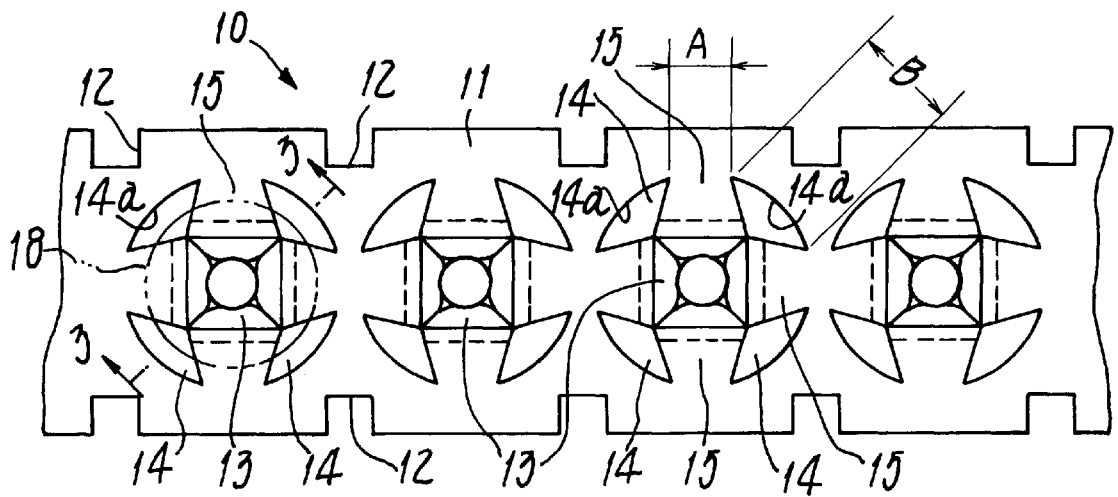
FIG. 1 is a plan view of a screw-holding belt provided in an embodiment of the present invention.

Now, some preferable embodiments will be described in detail referring to the drawings.

Figure 2:
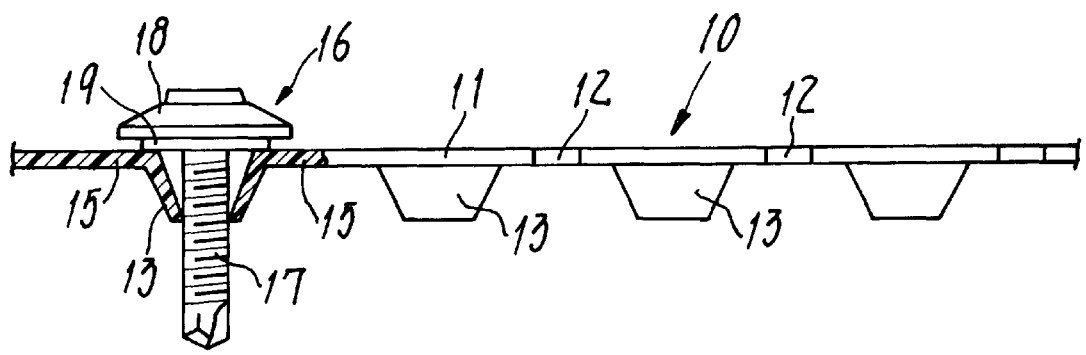
FIG. 2 is a front elevation of the belt shown partly in vertical cross section.
Figure 3:
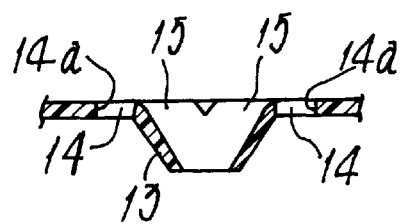
FIG. 3 is a cross section taken long the line 3—3 in FIG. 1.

FIG. 1 shows in plan view a screw-holding belt 10 which the present invention provides, and FIG. 2 also shows the belt 10 in front elevation and partially in cross section. Only one of headed screws held by the belt 10 is shown, for the purpose of a concise description.

Figure 5:
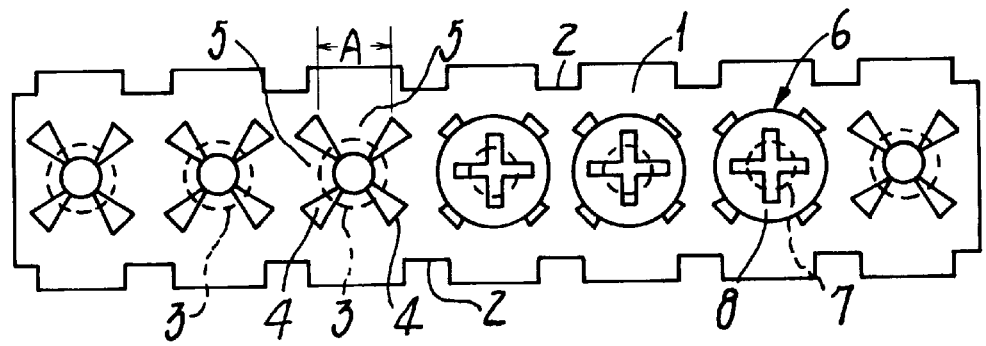
FIG. 5 is a plan view of the prior art screw-holding belt also having cylinders.
Figure 6:
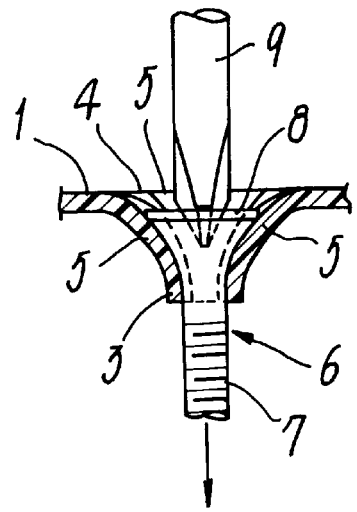
FIG. 6 is a partial cross section of the prior art belt wherein a headed screw held in the cylinder is being pushed with a driver bit away from the belt.

That belt 10 is an integral piece made by molding a relatively hard polypropylene. A band-shaped body 11 of the belt has a row of cutouts 12 formed at a pitch in and along each opposite lateral side of the body 11 of the belt. Those cutouts 12 will serve to intermittently drive the belt body, which has a row of screw-holding cylinders 13 formed in said body, longitudinally thereof and at the same pitch as the cutouts. Each cylinder 13 has an opening located in flush with an upper surface of the belt body 11 so as to receive and hold a shank 17 of each headed screw 16. The belt 10 further comprises four apertures 14 formed in the belt body and extending outwardly and radially from a periphery of the opening of each screw-holding cylinder 13. Each aperture 14 is of a sector form. The central cylinder 13, the four apertures 14 and four skirts 15 each interposed between the adjacent two apertures do constitute one screw holder, similarly to the prior art shown in FIG. 5. However, the apertures 14 of the present invention differ from those incorporated in said prior art screw-holding belt, in that the skirts 15 can easily bend themselves towards a body of each cylinder 13.

In detail, each sector-shaped aperture 14 has a central angle, that is an angle included between a pair of generally straight and radial sides, of 90 or more degrees. Thus, each aperture has a width increasing towards its bottom 14a located most remote from said cylinder 13 such that these bottoms 14a are portions of an imaginary circle which is coaxial with the cylinder 13 and of a diameter relatively greater than that of a head 18 of each headed screw 16. The adjacent two apertures 14 and 14 define between them a skirt 15 having a width that gradually reduces towards the skirt's base located remote from the cylinder. Each skirt's width or a distance 'A' between the bottoms 14a of the adjacent apertures 14 is rendered smaller than length 'B' of each bottom 14a in this embodiment.

On the other hand, each screw-holding cylinder 13 is generally of a pyramidal shape, whose four ridgelines continue to the respective apertures 14. By virtue of this structural feature, the cylinders 13 will be easy to break along the ridgelines when the skirts 15 are bent forcibly.

Each headed screw 16 to be held on and by the belt 10 discussed above has beneath its head a neck, to and around which a seal ring 19 is fixedly secured such that the screw heads 18 are rendered apparently and somewhat larger than ordinary ones.

In use, the belt 10 will be loaded at first with the headed screws 16 by inserting their shanks 17 in the cylinders 13 of said belt. At any desired construction site, a driver or the like tool engaging with the head 18 of each screw will thrust it out of the belt body 11 and urge it to fasten any articles to each other. When the belt carrying the screws is used in this manner, the head 18 of every screw being forced through the cylinder 13 will cause the skirts 15 to bend towards this cylinder, while breaking same along the ridgelines thereof each extending between a pointed top of the aperture 14 and a periphery of said cylinder. Since the width 'A' of the basal portion of each skirt 15 is smaller than that of its end portion adjacent to the cylinder 13, all the skirts can be bent very easily even if the screws 16 had integral therewith enlarged heads. The headed screws 16 can be pushed out from the belt body 11 without the need of imparting to them any excessive or undue force, even if said body is made of a relatively hard polypropylene.

Figure 4:
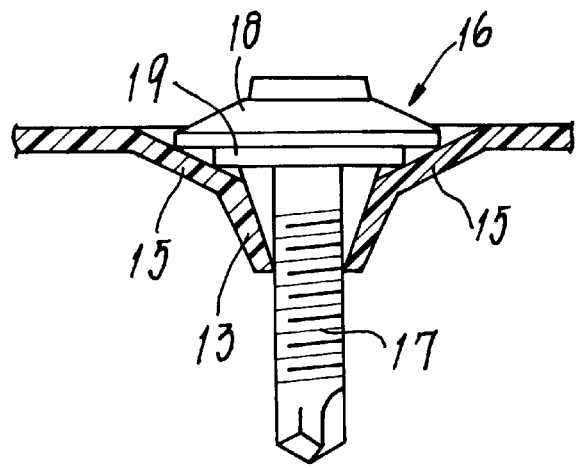
FIG. 4 is a vertical cross section corresponding to FIG. 2 and showing another embodiment.

The seal rings 19, that may be attached to headed screws as is the case shown in the drawings, will considerably increase the diameter and height of the screw heads 18. FIG. 4 shows a modified embodiment in which the skirts 15 are recessed a small distance from the front side of the belt body 11 and towards the corresponding cylinder 13. This feature is beneficial in that the head 18 of each screw 16 will fit in part in such a recessed area so as not only to take a more stable position relative to the belt body but also to be more easily removed therefrom.

In summary, the apertures formed in the screw-holding belt of the present invention are of such an "outwardly expanded" sector form that the basal outer portion of each skirt defined between the two adjacent apertures is smaller in width than the inner end portion. The skirts are thus very easy to bend when the screws are pushed out of the belt with a driver or the like tool, in any case wherein the head of each screw is enlarged with a seal ring, and/or the belt body is made of a considerably hard polypropylene.

What is claimed is:

1. A screw-holding belt comprising:

a belt body that is a band made of a flexible plastics sheet;

a row of cutouts formed at a pitch in and along at least one of opposite lateral sides of the belt body, the cutouts serving to intermittently drive the belt body;

a row of screw-holding cylinders formed in the belt body longitudinally thereof and at the same pitch as the cutouts, wherein each cylinder has an opening located in flush with an upper surface of the belt body so as to receive and hold a shank of each headed screw;

a plurality of apertures formed in the belt body and extending outwardly and radially from a periphery of the opening of each screw-holding cylinder;

each aperture being of a sector form having a width increasing towards its bottom located most remote from said cylinder such that these bottoms are portions of an imaginary circle which is coaxial with the cylinder and of a diameter relatively greater than that of a head of each screw; and skirts each defined between the adjacent two apertures so that each cylinder is surrounded by the skirts, wherein each skirt has a circumferential width decreasing towards the imaginary circle.

2. A screw-holding belt as defined in claim 1, wherein the width of each skirt between the bottoms of the adjacent two apertures is smaller than a circumferential length of the bottom of each aperture.

3. A screw-holding belt as defined in claim 1 or 2, wherein the skirts 15 are recessed a small distance from the upper surface of the belt body 11 and towards the corresponding cylinder 13.

* * * * *